July 11, 1944.  J. MIHALYI  2,353,257
APPARATUS FOR FOCUSING CAMERAS
Filed Sept. 26, 1942   2 Sheets-Sheet 1
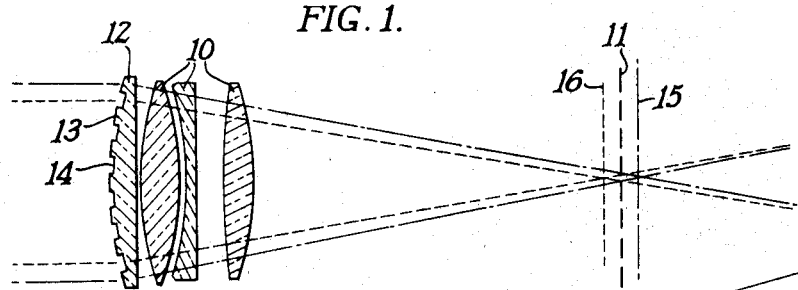
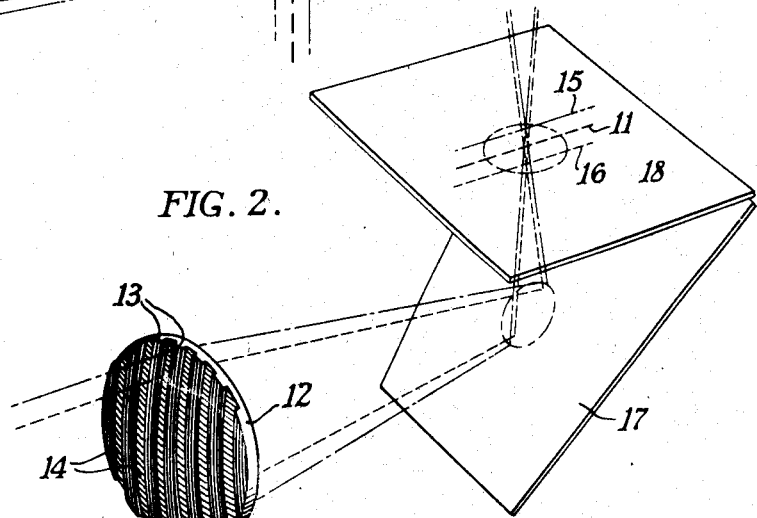
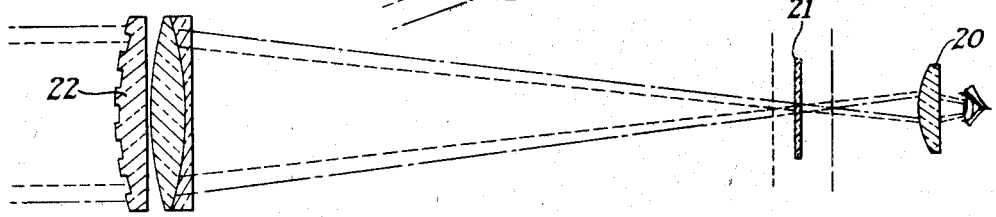
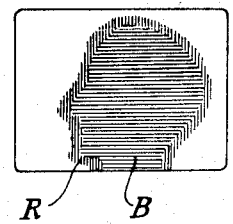
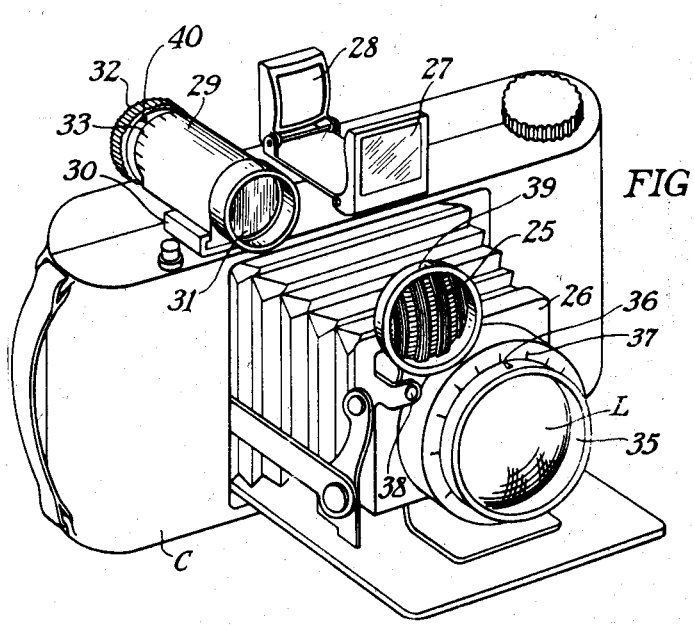
JOSEPH MIHALYI
INVENTOR
BY
ATTORNEYS July 11, 1944.  J. MIHALYI  2,353,257
APPARATUS FOR FOCUSING CAMERAS
Filed Sept. 26, 1942  2 Sheets-Sheet 2

JOSEPH MIHALYI
INVENTOR
BY
ATTORNEYS

Patented July 11, 1944

2,353,257

UNITED STATES PATENT OFFICE 2,353,257

APPARATUS FOR FOCUSING CAMERAS

Joseph Mihalyi, Rochester, N. Y., assignor to Eastman Kodak Company, Rochester, N. Y., a corporation of New Jersey Application September 26, 1942, Serial No. 459,790

9 Claims. (Cl. 95—44)

This invention relates to photography and more particularly to a focusing device for photographic cameras which may either indicate a focal distance of objects being photographed or which may be directly coupled with a camera objective to automatically indicate when the camera is in focus. One object of my invention is to provide a relatively simple type of focusing device which can be either applied to standard types of cameras or which can be built into cameras. Another object of my invention is to provide a focusing indicator which can be readily viewed by an operator and which does not require the usual extremely accurate observation to determine the degree of sharpness of an image in order to pick up the desired focal point. Another object of my invention is to provide a focus or range finder in which color is primarily relied on to determine the proper focal position rather than the usual degree of sharpness which ordinarily is in monochrome and which is somewhat difficult to determine. Other objects will appear from the following specification, the novel features being particularly pointed out in the claims thereof.

In known types of range finders and in many types of focusing cameras a lens is used to produce an image on a ground glass. The lens is focused until the image becomes sharp, but it is frequently difficult, particularly with short focal length lenses, to determine the point at which the maximum sharpness occurs. This difficulty increases as the F value of the lens decreases, and even relatively long focal length lenses when stopped down to a small aperture make accurate ground glass focusing difficult. In some known types of range finders color has been used to assist an operator in making an image sharp by providing complementary colors, for instance, which may produce a natural color image when the image is sharp. However, such finder systems have ordinarily used a single lens to produce the image, or perhaps a compound lens, so that the final focusing is usually done by determining the degree of sharpness of the image.

I have provided a novel type of range finding instrument in which a bi-focal lens is used and in which it is unnecessary to rely on the sharpness of the image, but by properly designing such a lens it is possible to readily pick up accurately the desired focal point by observation and by eliminating color fringes from the point of principal focus.

Coming now to the drawings in which like reference characters denote like parts throughout:

Fig. 1 is a somewhat schematic view of a focus indicator constructed in accordance with and embodying a preferred form of my invention;

Fig. 2 is a perspective view of the essentials of a focus indicator embodying another form of my invention;

Fig. 3 is a schematic view of a focus indicator constructed in accordance with still another embodiment of my invention;

Fig. 4 is a perspective view of a camera which may be equipped with a focus indicator embodying my invention;

Fig. 5 is a plan view of an image which has not yet been properly focused as it would appear on the image fixing plane of a focusing finder constructed in accordance with my invention;

Figure 6:
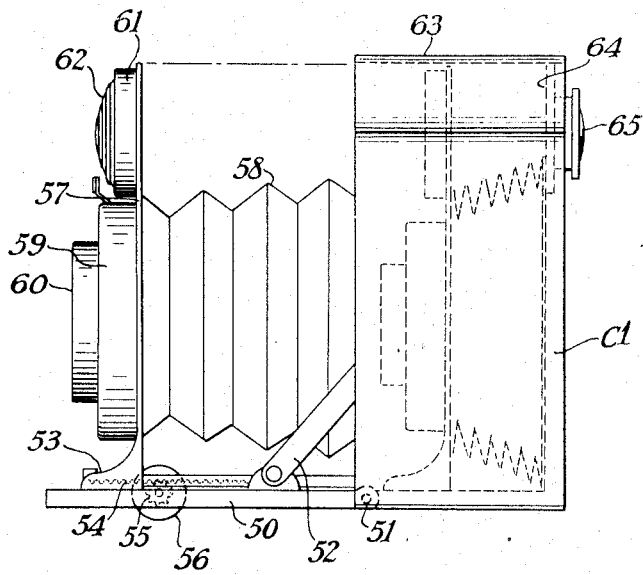
Fig. 6 is a side elevation of a typical camera which can be automatically focused by means of my improved type of range finder.

My invention comprises broadly providing a range finder lens which is bi-focal—that is which has two or more areas or zones divided into two focal lengths. Such a lens would, of course, produce images in two different planes, but if these planes are close together there is an intermediate plane in which both images will be of the same magnification. This does not mean that the two images will exactly coincide to produce a critically sharp image, but when the two images are of the same magnification the degree of sharpness will of course depend on the relationship of the focal length of the two lenses. These focal lengths can be so selected that an image, which is perfectly satisfactory to look at, can be used to accurately focus, because I prefer to provide the bi-focal lens zone or zones which are of one focal length of one color and the bi-focal length zone or zones of a second color which are of another focal length. By properly selecting the colors a natural color image may be produced when the proper focal point is reached and until it is reached there will be an image having a color fringe of predominantly one color or another according to the setting of the bi-focal lens. Thus an operator may learn, for instance, that when the color fringe is predominantly blue the bi-focal lens must be moved forwardly, and when the predominating color fringe is red the bi-focal lens must be moved rearwardly to produce a natural color or a neutral color image. However, it is not necessary for an operator to know this, although it may facilitate range finding. All the operator needs to know is that when the color fringes disappear from the object being focused, the proper setting has been reached.

More specifically, in the diagram of Fig. 1, it will be noticed that there is a compound objective made up of a number of lenses 10 and there is a front lens 12 which is divided into the zones 13 and 14, the zones 13 being adapted to focus on a plane 15 at the same time the zones 14 are brought to a focus on a plane 16. There is an intermediate plane 11 between planes 15 and 16 at which point the images from a bi-focal lens are of the same magnification even though at this point the two images are not critically sharp. Since they are of the same magnification, there will be no color fringes, and by selecting the proper focal lengths for the bi-focal lens such a lens can be coupled to an objective of a known focal length so that the objective would be accurately focused on the plane 11 while a bi-focal lens is focused in the planes 15 and 16. In other words, if the bi-focal lens elements have a mean focal length equal to the focal length of the camera objective, such a bi-focal lens can be used by directly coupling it to move with the objective to at all times indicate the proper focus.

In Fig. 2, I diagrammatically illustrate the upper portion of a twin lens reflex of a type in which the lens 12, here shown as a simple lens, may be movable with the camera objective in a known manner so that the bi-focal elements 13 and 14 will produce two images in the planes 15 and 16 and so that the images in the plane 11, which is the plane of the ground glass 18, will be of the same magnification. Thus the two-color images will eliminate a fringe of color when the objective is in focus. A mirror 17 is used in the customary manner to reflect the image.

In Fig. 3 the lens 22 may be a compound lens which is constructed as in the Fig. 1 and Fig. 2 embodiments as to the bi-focal lens. Here, the images are brought into a non-color fringing relationship of fixed magnification upon an image fixing surface here shown as a ground glass 21. An eyepiece 20 may be used to magnify the image.

In using such a device, if the observer sees the image shown in Fig. 5 through the eyepiece 20, he will notice a color fringe of red R extending around the principal point of focus which may be bluish. He will then adjust the distance between the bi-focal lens 22 and the ground glass 21 until this color fringe disappears at which time it will be at the proper focal setting.

Such a range finder is easy to use and can be readily applied to cameras on the market as indicated in Fig. 4. In this view the camera C may be of a known type having a lens L of the type in which the front lens cell 35 may be turned for focusing without moving the entire objective. The lens cell 35 may have a pointer 36 movable over a scale 37 to indicate the focal setting. The lens L is attached to a lens board 26, and I prefer to hinge to this lens board at 38 a ring 39 bearing a bi-focal lens 25 of the type described. This bi-focal lens may be swung to and from a folding position in which it can be enclosed in the camera body. In the position shown the focal lens 25 is in axial alignment with a ground glass 31 carried in a tubular cell 32 so that it may be moved to and from the bi-focal lens. A tubular support 29 holds this part of the optical system and it may be slid into a standard bracket 30 found on many cameras now on the market. The tube 29 has a scale 33 which will indicate by means of a pointer 40 the focal setting of the bi-focal lens 25.

With this type of camera the operator views the principal object being focused upon through a suitable eyepiece carried by the movable cell 32. By turning this cell until the two images formed by the bi-focal lens 25 are of a like magnification and until the color fringes disappear the proper setting can be obtained. When so obtained the distance is read from the pointer 40 upon the scale 33 and the objective L may be focused by turning the cell 35 until the pointer 36 indicates the same focal setting on the scale 37.

Figure 7:
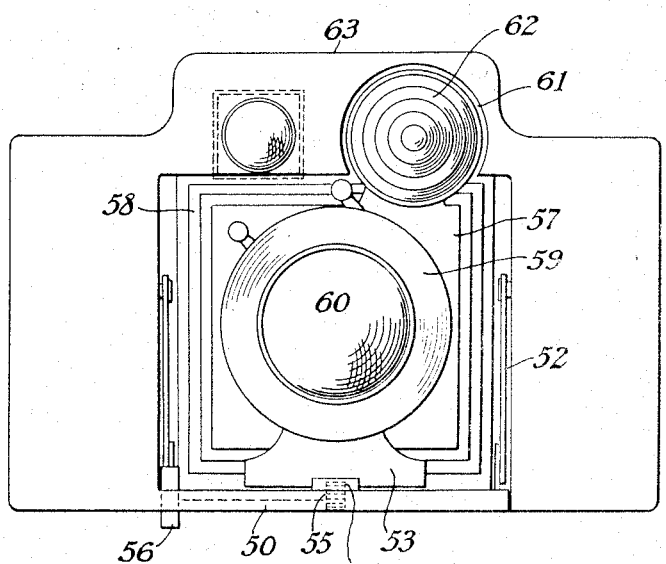
Fig. 7 is a front plan view of the camera shown in Fig. 6.

If, however, the focusing finder is to be built in it can be readily made completely automatic as indicated in Figs. 6 and 7. Here, the camera C—1 is provided with a drop bed 50 hingedly attached at 51 to the camera body and supported in an open position by braces 52. The lens carriage 53 may slide out on a track in a known manner and may be provided with a rack 54 and pinion 55 for focusing when a focusing knob 56 is turned. The lens carriage 53 supports a lens board 57 to which is attached the usual camera bellows 58. A shutter 59 supports an objective 60 of known focal length. The lens board 57 also supports a lens cell 61 carrying a bi-focal lens 62 which is adapted to be enclosed by the extension 63 of the camera casing and which is in axial alignment with an image fixing surface or ground glass 64. If desired, a focusing eyepiece 65 may be employed. With such a camera, as the camera lens 60 is focused by the knob 56, the bi-focal lens images fall upon the ground glass 64 and, when the object being focused upon loses its color fringes, the objective 60 will be correctly and accurately focused.

I have found that many types of bi-focal lenses can be satisfactorily used, and since it is not necessary to produce an extremely highly corrected image and to provide a lens which will give a critically sharp image, I have found that lenses may be molded out of suitable clear plastics which will give entirely satisfactory results. The bi-focal lens can, of course, be made of glass in the normal manner or of any other suitable material.

Figure 8:
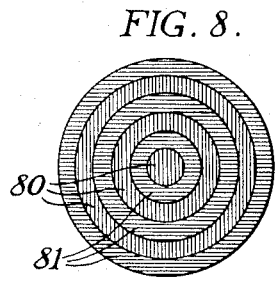
Fig. 8 is a front plan view of another type of bi-focal lens which may be used with my improved type of focus finder.
Figure 9:
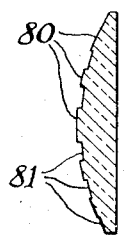
Fig. 9 is a side elevation of the bi-focal lens shown in Fig. 8.
Figure 10:
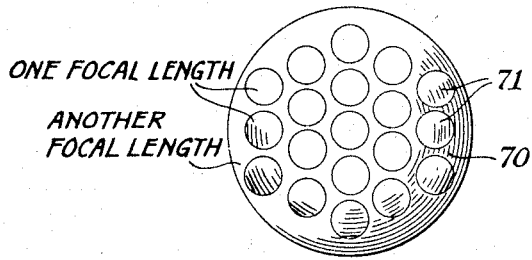
Fig. 10 is still another type of bi-focal lens.

In Figs. 1 to 4, inclusive, the bi-focal lens is shown as including parallel bands having different curvatures to produce the two different focal lengths required. I may also use a bi-focal lens as shown in Figs. 8 and 9 wherein the different focal length zones are circular in shape, or I may use the bi-focal lens of Fig. 10 in which one set of zones 70 may be irregular in shape and the other set of zones 71 may be circular in shape. In Fig. 8 the zones 80 are of one focal length and the zones 81 are of a second focal length. It is, therefore, not important what form the bi-focal lens takes so long as it contains two or more zones which focus on slightly spaced planes so that, by producing two images of the same magnification, a single image may be viewed. As above explained, I prefer to color the zone or zones of one focal length in one color and the zone or zones of the second focal length in another color. This may be done by coloring the lens or by applying a coloring material to the lens zones in any desired manner. If the colors selected are complementary when the images are of the same magnification the color fringes will disappear. When an operator focuses on a nearby object, of course color will appear over all of the field which is not in focus. I have found this a distinct advantage because it relieves the operator of the necessity of viewing the primary image to see if it is critically sharp. All that is necessary is to eliminate color from the point of principal focus and not pay any attention to whether or not this portion of the image is sharp.

The selection of the focal lengths of the bi-focal lenses is important but not necessarily critical. It is usually desirable to produce an image which, even if not sharp, is quite clear and recognizable to the operator. The focal lengths can be figured out to obtain any desired result as any size circle of confusion can be selected for the image to be viewed.

If, for instance, it is desirable to have an image made up of dots of, say, $\frac{1}{100}$ of an inch, such a circle of confusion can be figured for the particular focal length of lens used for the bi-focal lens, it being also necessary to determine what F value the lens shall have.

I have found that by selecting two focal lengths for the bi-focal lens, which are substantially equal to the focal length of the camera objective with one of the bi-focal lenses of slightly longer length than the camera objective, desirable results can be obtained. However, the difference between the focal length of the two bi-focal lenses should be sufficient to produce color fringes when the object being focused upon provides the images of somewhat different magnifications.

While I have not at the present time determined all of the limits of the various focal lengths which may be used, I have found that an entirely satisfactory bi-focal lens can be selected by providing one bi-focal area of $\frac{1}{16}$ less than the focal length of the camera objective and the other bi-focal area of $\frac{1}{16}$ more than the focal length of the camera objective. Different effects can, of course, be obtained by varying these proportions and they can be varied to quite a considerable extent and still permit accurate focusing of the camera objective. It is, therefore, understood that the figures given are purely by way of example and that a much smaller or larger variation may be made in the length of bi-focal zones from the focal length of the camera objective without producing undesirable effects.

What I claim is:

1. The combination with a camera having an objective adjustable for focusing, of a focusing finder coupled to the adjustable objective comprising a bi-focal lens having a mean focal length equal to the focal length of the camera objective, an image fixing surface in alignment with the bi-focal lens to receive images formed thereby, said images being of equal magnification when said objective is focused upon an object.

2. The combination with a camera having an objective adjustable for focusing, of a focusing finder coupled to the adjustable objective comprising a bi-focal lens having a mean focal length equal to the focal length of the camera objective, means for differentially coloring the two images formed by the bi-focal lens, an image fixing surface positioned to receive the colored images, said camera objective being adjusted to proper focus when color fringes disappear from the image focused upon the image fixing surface.

3. A focusing finder for cameras having an objective of known focal length movable relative to an exposure frame for focusing, comprising, in combination, a bi-focal lens mounted to move with the camera objective, the bi-focal elements being of a focal length approximating the local length of the camera objective but one bi-focal element having a longer focal length and the other bi-focal element a shorter focal length than the camera objective, and an image fixing surface positioned axially of the bi-focal lens on which images formed thereby may appear.

4. A focusing finder for cameras having an objective of known focal length movable relative to an exposure frame for focusing, comprising, in combination, a bi-focal lens mounted to move with the camera objective, the bi-focal elements being of a focal length approximating the focal length of the camera objective but one bi-focal element having a longer focal length and the other bi-focal element a shorter focal length than the camera objective, and an image fixing surface positioned axially of the bi-focal lens on which images formed thereby may appear, one image being colored differently from the other image whereby color fringes may be eliminated only when said images are of like magnification at which point said camera objective will be in focus.

5. The combination with a camera having an objective adjustable for focusing, of a focusing finder coupled to the adjustable objective comprising a bi-focal lens having a mean focal length equal to the focal length of the camera objective, said bi-focal lens including an integral lens having separate areas, one area of one focal length and another area of another focal length, an image fixing surface in alignment with the bi-focal lens to receive images formed thereby, said images being of equal magnification when said objective is focused upon an object.

6. The combination with a camera having an objective adjustable for focusing, of a focusing finder coupled to the adjustable objective comprising a bi-focal lens having a mean focal length equal to the focal length of the camera objective, said bi-focal lens including at least two differently colored and differently curved surfaces adjacent each other, one having a focal length slightly greater than the focal length of the other, an image fixing surface in alignment with the bi-focal lens to receive images formed thereby, said images being of equal magnification when said objective is focused upon an object.

7. The combination with a camera having an objective adjustable for focusing, of a focusing finder coupled to the adjustable objective comprising a bi-focal lens having a mean focal length equal to the focal length of the camera objective, said bi-focal lens including a plurality of zones divided into two different focal lengths, the zones of one focal length being differently colored with respect to the zones of the other focal length, an image fixing surface in alignment with the bi-focal lens to receive images formed thereby, said images being of equal magnification when said objective is focused upon an object.

8. A focus indicator for use with cameras having an objective adjustable for focusing and comprising a range finder including a bi-focal lens having a mean focal length equal to that of the camera objective, an image fixing surface in alignment with the bi-focal lens to receive images formed thereby and means for indicating the focal setting of the camera objective from a position of the bi-focal lens determined by having the two images formed by the bi-focal lens of equal magnification.

9. A focus indicator for use with cameras having an objective adjustable for focusing, comprising a finder including a bi-focal lens, the mean focal length of which is equal to that of the camera objective, means for differentially coloring the images formed by the bi-focal lens, an image fixing surface in alignment with the bi-focal lens to receive colored images formed thereby, and means including a scale and pointer for indicating the focal setting of said camera objective from a position of the bi-focal lens determined by adjusting said bi-focal lens until color fringes are eliminated from the image fixing surface.

JOSEPH MIHALYI.